INVENTOR.
ROY F. ENSIGN
BY
Barkelew & Ferris

United States Patent Office 2,896,599
Patented July 28, 1959

2,896,599

GASEOUS FUEL FEED SYSTEMS, WITH AUTOMATIC STARTING AND IDLING CONTROL, FOR INTERNAL COMBUSTION ENGINES

Roy F. Ensign, Fullerton, Calif., assignor to Ensign Carburetor Company, Fullerton, Calif., a corporation of California Application May 19, 1958, Serial No. 736,321

27 Claims. (Cl. 123—120)

This application is a continuation in part of my co-pending application Ser. No. 590,475, filed June 11, 1956.

This invention has reference to gaseous fuel feed systems for internal combustion engines; and its general objective is to provide a new and improved means for automatically causing such systems to effectually feed sufficient fuel for starting and idling, and to feed fuel uniformly throughout all ranges of engine operation, subject to known modification controls which may be applied if desired. A general objective is to modifyingly control the delivery pressure of a regulator by a system controlled as to actuation by engine operation.

In some present commonly used gaseous fuel systems, a pressure regulator takes the fuel from a high pressure source and is commonly set to deliver to the carburetor venturi at a pressure slightly sub-atmospheric—usually at a minus pressure of about one-quarter inch of water. That is done by biasing the diaphragm-valve system of the regulator (of the last stage in a multiple stage regulator) in a valve closing direction by a force that makes it necessary to lower the pressure in the regulator delivery chamber by that, say, quarter inch of water, below a reference pressure acting on the outer face of the diaphragm, in order to put the valve system in balance ready to open and feed fuel. The reference pressure on the outer face of the diaphragm is commonly atmospheric or the pressure existent at the carburetor air intake. And when the engine is standing, with equal pressures on opposite faces of the diaphragm, the valve is held closed by the biasing force.

On starting turn-over with the throttle closed, to or near to, idling position, and at idling, the velocity depression at the venturi throat is commonly less than that quarter inch of water; and so, special arrangements such as chokes and idling by-passes or other controls are commonly used for starting and idling.

The present invention, in one of its typical forms, provides that, under a valvular control actuated by virtues of engine operation, gaseous pressure from a constant high pressure source (at a pressure higher than atmospheric or the air intake pressure) is applied to raise or control the normal delivery pressure, regardless of what that normal pressure may be. In certain forms of the system that higher pressure is applied to a reference chamber of the regulator diaphragm to increase the opening force on the regulator valve by the desired amount to put it in balance, or substantially so, or even to open it slightly; so that the small venturi throat depression can then draw fuel from the delivery chamber. That action of balancing the regulator takes place uniformly throughout all stages of engine operation, including starting turn-over, idling and operation through all medium and full power ranges. The regulator then operates uniformly to supply fuel to the venturi in uniform proportion to the air flow, at all stages of operation. That uniform proportion may, of course, be modified if desired by additional provisions such, for instance, as an economizer.

However, the regulator may be set to normally deliver at, or somewhat above, atmospheric pressure. In such a system the invention provides for shutting off fuel delivery when the engine is standing by a cut-off valve on the initial regulator feed, that valve being controlled by virtue of engine operation. And that valve then controls the actuation of the means which, by application of pressure to a reference pressure chamber, sets and controls the delivery pressure of the regulator throughout engine operation.

There are several preferred features of the invention. One such preferred features is that the high pressure source is a higher pressure stage of a multiple-stage regulator, the last stage of which delivers to the venturi. In a two-stage regulator, for example, the first stage pressure, substantially uniform, is necessarily higher than the pressure existent at the carbureter air intake. Broadly, however, the high pressure source may be any suitable and preferably regulated source, and the regulator may be single stage.

It is also preferred that the required reference pressure be obtained by feeding the high pressure to a regulator reference chamber at a fixed rate, and by bleeding gas from that chamber at a fixed rate, either or both rates being preferably adjustable. And the bleed may and preferably goes into the carburetor.

The control valve may be actuated in various manners; in fact, by any means that insures its opening whenever the engine is turning over and its closing when the engine is standing. For instance, the control valve may be operated by a diaphragm which is subjected to the depression existent in the intake manifold. With the throttle closed down to idling position, that depression is ordinarily sufficient to reliably operate the valve on starting turn-over. But for starting it may be desirable to open the throttle somewhat, and then, particularly with slow turn-over of a cold engine, the manifold depression may not be sufficient to reliably operate the control valve. Consequently it may be desirable to actuate the valve by means actuated in the starting motor circuit, or the ignition circuit, and in the forms where the control of the system is by an initial cut-off valve, the valve actuation is preferably electrical. The following detailed description sets out various illustrative preferred forms that the invention may take, reference being had to the accompanying drawings in which:

Figures 1, 2:
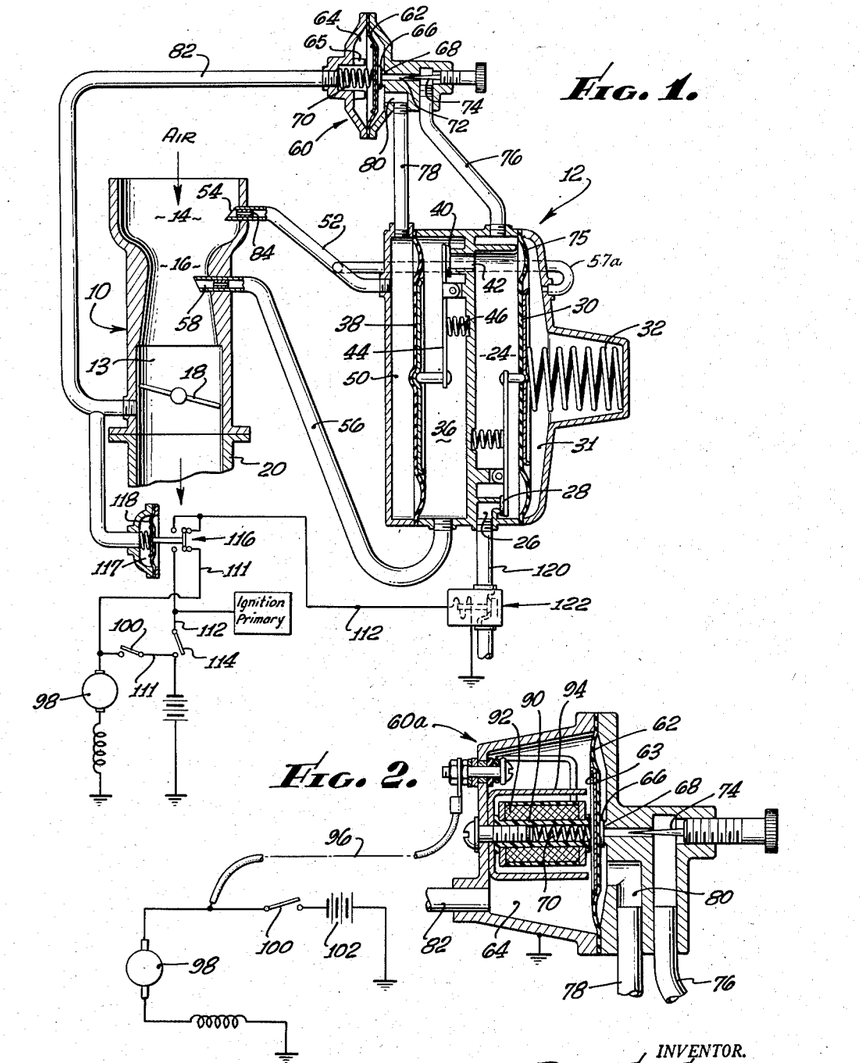
Fig. 1 is a schematic showing of one form, where the control valve is actuated by manifold depression.
Fig. 2 is a schematic showing how the control valve may also be actuated in the starter motor circuit.

In Fig. 1, 10 represents any conventional carburetor and 12 any conventional two-stage pressure regulator. The carburetor is shown with an air and mixture passage 13, with air intake 14, venturi throat 16, throttle 18, and the engine intake manifold is indicated at 20.

Regulator 12 is shown with a first stage chamber 24 having a high pressure inlet at 26 controlled by first stage valve 28 operated by first stage diaphragm 30. The pressure maintained in chamber 24 is controlled by the reference pressure tending to open valve 28; in this case mainly the pressure of reference spring 32. The pressure in first stage chamber 24 is commonly set to be about eight or ten p.s.i. above atmospheric; in practise it must necessarily be above the pressure existent at the carburetor air intake. The pressure in reference chamber 31 on the outer face of diaphragm 30 is commonly atmospheric, and may be so here; but see below.

The second stage of the regulator is shown as having a delivery chamber 36 of which the second stage diaphragm 38 forms one wall. That diaphragm operates the second stage valve 40 that controls the passage 42 leading from the first to the second stage chamber. The connection between 38 and 40 is shown in the form of a lever 44. Movement of diaphragm 38 into chamber 36 causes valve 40 to open. A spring 46 tends to close the valve, biasing it closed when pressures on opposite faces of diaphragm 38 are equal.

The outer face of diaphragm 38 is exposed to the fluid pressure in a reference chamber 50. Communicating with that reference chamber is a balance tube 52 which, preferably, with a Pitot formation 54 on its end, picks up the total pressure in the air intake 14. If the air intake is wide open and unobstructed that balance tube is in full effect simply a communication of 50 with atmospheric pressure. Air intakes are ordinarily obstructed, e.g. by air cleaners; and in any such case the balance tube as shown picks up the actual effective pressure at the intake. Delivery chamber 36 has an outlet through tube 56 leading to fuel nozzle 58 at the venturi throat. With the engine standing, diaphragm 38 is subjected to equal fluid pressures, atmospheric, on its opposite faces, and in this form spring 46 then holds valve 40 closed by a force equal to the opening force extertible on the valve by a fluid pressure of, say, one-quarter inch of water on the outer face of diaphragm 38. Consequently, in this regulator arrangement, the pressure in delivery chamber 36 has to be that much lower than in reference chamber 50 in order to put the diaphragm-valve system in balance so that a slight suction through 56 will lower the pressure in 36 enough to cause the valve to open.

The system as so far described is typical of gaseous fuel feeds now in use. My invention, in one of its forms, lies in the combination with such known systems of the additional features now to be described with reference to the typical and illustrative showings in the drawings.

In Fig. 1, a valve, generally designated 60, has a diaphragm 62 exposed on one face to fluid pressure in chamber 64. Its opposite face carries a valve pad 66 which is seated on a valve seat 68 by the pressure of spring 70 operating on the diaphragm. A port 72, controlled preferably by an adjustably restrictive needle valve 74, leads to valve seat 68. A tube 76 connects the pressure source, in this instance the first stage chamber 24, with that restricted port. A tube 78 connects the chamber 80, into which valve 66, 68 discharges, to the second stage reference chamber 50. A tube 82 connects diaphragm chamber 64 of the valve to the engine intake manifold by connecting with mixture passage 13 at a point which is shown here as always beyond the throttle. If an air cleaner or other pressure dropping obstruction is applied to air intake 14, as illustrated in other figures, the connection of 82 may be at any point in the air and mixture passage beyond that obstruction.

The communicating passages 76 and 78, the port 72 and chamber 80 are preferably all large enough in effective cross-section, as compared with the effective cross-section of the restricted passage at the valve 74, that the restriction at 74 has effective control over the rate of gas flow through those passages. And the passage in tube 78 between chambers 80 and 36 should be fairly large for other reasons referred to below. Spring 70 is strong enough to hold valve pad 66 tightly on its seat against the pressure exerted on it by the fluid pressure in port 72 plus whatever pressure there is on the diaphragm in chamber 80. And preferably the spring is so set or chosen, and the effective area of diaphragm 62 is such, that, on the application to chamber 64 of the least manifold depression that occurs in any operation of the engine (typically, a low starting turn-over depression of, say, three inches or less of water) with the throttle closed or nearly so (or with the throttle open, if the air intake is obstructed), the valve will open widely enough that the effective valve opening is large as compared with the effective opening at the restriction 74. Those provisions leave the control of the effective size of the passage between 24 and 50 at the settable or adjustable orifice at 74, and regardless of how much wider valve 66 may open under depressions higher than the chosen minimum. If the valve is limited in its opening, as by stops 65 for instance, and if the arrangement is such that the valve is always opened to its full stopped opening by the least manifold depression, the valve opening need only be large enough as, preferably, to leave control of the passage with the adjustable restriction at 74.

The passage in balance tube 52 preferably has an orifice bushing 84, or other settable or adjustable restriction that controls the effective size of that bleeding passage that bleeds reference chamber 50. Or, the passage size of tube 52 may itself constitute a bleed orifice of chosen fixed size. That bleeding orifice may be and preferably is fairly small; for example it may be about three-sixteenths inch diameter in a system feeding an inch-and-a-quarter size carbureter.

Operation is as follows. The orifice at valve 74 is so set in size with relation to the size of the bleed orifice 84 that the pressure in reference chamber 50, with valve 60 open, will be raised above what it otherwise is by about the amount that the normal delivery pressure in 36 is below the pressure in 50 with valve 60 closed. A practical manner of making that setting is described just below. Assuming that the setting is approximately correct, then on turning over to start, valve 60 opens and the reference pressure in 50 tending to open regulator valve 40 is immediately increased by approximately the amount that the normal delivery pressure is below the pressure existent at the air intake. That puts the diaphragm-valve system 38, 40 approximately in balance so that the slight venturi throat depression will draw in fuel to start the engine with the throttle in or near idling position.

As soon as the engine is idling fine adjustment at valve 74 can then be made to slightly vary the pressure in 50 to obtain the best idling mixture. It has been found that, usually, adjustment of 74 at normal idling speed is sufficient. But, if desired, similar slight adjustment can be made at 74 to obtain the best mixture through medium operating ranges. When either of those things is done and the mixture remains approximately constant through all operating ranges, it is known that the regulator is very closely in balance to deliver at the pressure existent at the air intake; that is, the pressure in reference chamber 50 is approximately as much above the air intake pressure as the normal delivery pressure of the regulator is below that air intake pressure.

During operation a small constant amount of gas flows into the carburetor through bleed orifice 84. With the regulator in balance, the venturi throat depression draws in fuel at 58 in fixed ratio to the air flow throughout all stages of operation. The small bleed at 84 adds a small constant amount of gas, flowing under the difference in pressure between 50 and the air intake—a difference in practice of about one-quarter inch of water. Preferably that constant amount is only a small fraction of the full amount required for idling.

As a result of that constant small fuel flow, the mixture at starting and idling is slightly richer than that through medium and heavy ranges. At those ranges the constant bleed flow is negligible. Consequently if adjustment at 74 is made for ideal mixture proportions through medium ranges, the idling and starting mixture will be slightly rich, which, if anything, is desirable. If, on the other hand, the final adjustment is made for ideal proportions at idling, the mixture through the medium and heavy ranges will be slightly lean, which also may be desirable. Or a compromise adjustment may be made between the two conditions. The difference between the idling and medium range proportions may be made so slight as to be negligible by reducing the size of bleed 84.

As has been mentioned, the source of higher pressure may be any suitable source. Thus the first stage chamber 24 of Fig. 1 may be viewed simply as a pressure source for the second stage of the regulator and for feed to valve 60. In all essentials the regulator may be one of single stage. And this observation applies to any of the system forms hereinafter described.

It may also be noted that the action of controlling the delivery pressure of the regulator is the same regardless of the normal delivery pressure for which the regulator is set. Thus, the regulator of Fig. 1 may be set to normally deliver at, say, atmospheric pressure or even slightly above. In that event its delivery may be shut off, and opened under engine control, by the shut-off system to be described later.

The passage in tube 78 should be, as noted above, fairly large; large enough to freely pass the pressure in valve chamber 80 to the relatively large chamber 50. Otherwise the pressure in 80 may delay the closing of valve 66 after the engine stops operating.

It will be understood that the high pressure fuel feed at 120 to the first stage of the regulator may be in fully gaseous form. However, the high pressure fuel usually used in such systems as here described is typically butane, which, at ordinary atmospheric temperatures is in liquid form at the high pressure. Upon release of that high pressure to the much lower pressure in first stage chamber 24, the fuel ordinarily vaporizes; the heat of vaporization in a small regulator being supplied by conduction and radition from the atmosphere and the surroundings, or in a regulator of large capacity being supplied by applied heat. In some instances the fuel may not completely vaporize in 24, some fine misty globules remaining in liquid form. In such a case it may be desirable, if not necessary, that the communication 76 shall take off from first stage chamber 24 at a point where only fully vaporized gas will flow into it and thence past the orifice at 74. If there is any fuel in liquid phase in first stage chamber 24, and if liquid globules flow past the restriction at 74, their subsequent vaporization will uncontrollably vary the pressure in 50. To prevent that the take-off of 76 may preferably be so located or shielded that globules will not enter it. Such location or shielding will depend upon the physical construction of, and the flow paths of the fluids in, any actual regulator. In the purely schematic showing here that prevention is illustrated by the shield 75 which shields 76 from the flow going to 42 and places the intake of 75 in a quiescent zone where any globules which may find their way behind the shield will have time enough to vaporize there or in passage 76 before passing the restriction at 74.

It will be understood also, that in regulators of the type and use here described, that if an initially liquid fuel such as butane does not fully vaporize in first stage chamber 24, it is completely vaporized in second stage chamber 36 at its lower pressure, with heat of vaporization supplied as above stated.

As so far described, the pressure at the source of high pressure (the first stage of the regulator here) is a pressure that is constant with relation to atmospheric pressure, reference chamber 31 being open to atmosphere. The pressure in air intake 14 may vary slightly with relation to atmospheric, due to variations in the action of e.g. a cleaner on the intake. Ordinarily those variations are a very small percentage of the total pressure drop between 24 and the air intake, and therefore will have a negligible effect on the pressure maintained in 50. However, those slight variations may be eliminated if desired by applying air intake pressure to reference chamber 31, which will keep the pressure in 24 at a fixed figure with relation to the intake pressure rather than with relation to atmospheric. That is done simply by applying the balance pressure picked up by 54 to chamber 31; as by the balance connection 52a.

Figures 1A, 4, 8:
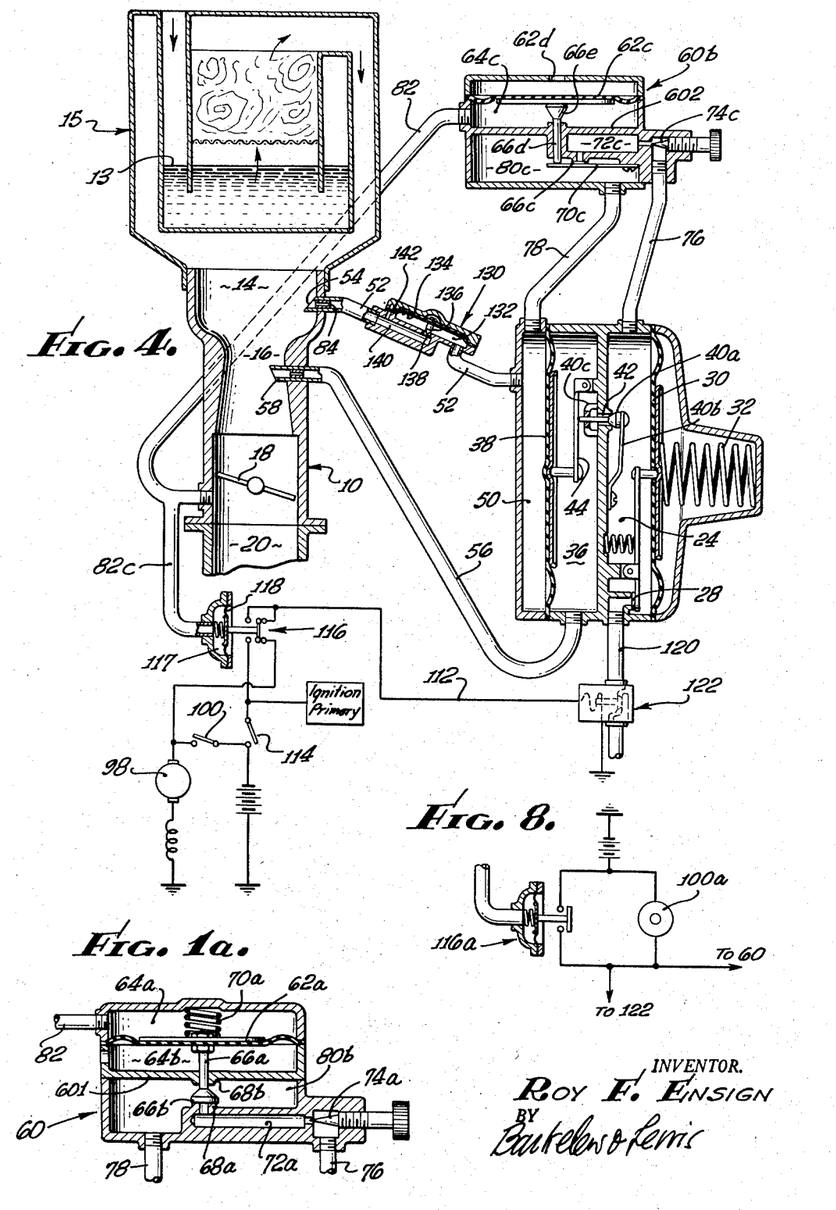
Fig. 1a shows a modified form of control valve.
Fig. 4 is a schematic similar to Fig. 1 showing modifications.
Fig. 8 shows a modified control circuit.

Fig. 1a shows a variant form of valve 60. In that figure, the communicating passages 76, 78 and 82 correspond to those passages in Fig. 1. Tube 82, connecting to the air and mixture passage, communicates with chamber 64a at the back of diaphragm 62a, and the manifold depression draws the diaphragm back (up, in the figure) against the pressure of spring 70a. The chamber 64b below the diaphragm is open to atmosphere, so that the whole depression in 82 below atmosphere, including any depression due to air intake obstruction, is available to operate the diaphragm. With this form of valve the throttle need not be closed down for starting, the diaphragm then being operated solely by the pressure drop due to e.g. an air cleaner.

A wall 601 divides chamber 64b from chamber 80b, and a valve stem 66a secured to diaphragm 62a extends movably through that wall and carries valve closure 66b in chamber 80b. A passage 72a is fed with fluid under pressure from passage 76 under control of valve 74a and has a valve seat 68a under valve closure 66b. Normally closure 66b is pressed against seat 68a by spring 70a, closing passage 72a. On application of manifold depression to chamber 64a diaphragm 62a moves valve closure 66b up, opening passage 72a to deliver pressure fluid to passage 78 that goes to reference chamber 50. In its upper position 66b seats on seat 68b to seal the opening through which stem 66a passes through wall 601.

It is often desirable, to insure quick starting of an engine, to open the throttle somewhat beyond the idling position. When that is done, the manifold depression may become so small that it cannot be relied upon to operate the control valve 60 unless its diaphragm 62 is made very large, which is undesirable. Fig. 2 shows one arrangement for overcoming that difficulty and for insuring quick starting with the throttle opened.

In that figure the control valve 60a is similar to the valve of Fig. 1, and the parts and connection tubes that are the same are designated by the same numerals. The diaphragm plate 63 of diaphragm 62 is composed of soft iron. An electro-magnet with a soft iron core 90, winding 92 and an outer soft iron sheath 94 is installed in the chamber 64. Spring 70 is conveniently located inside core 90. The ends of core 90 and sheath 94 are spaced a short distance from diaphragm plate 62a and form, with that plate, a closed magnetic circuit except for the short gaps at the plate. The gap spacing may be such that the core and sheath form the stops which limit the opening of valve 66 in the same manner as described for stops 65 in Fig. 1. The inner end of winding 92 may be grounded, and its outer end connected, as by conductor 96, into the circuit of starter motor 98. As schematically indicated here, the starter switch 100 controls supply of current from battery 102 to both the starter motor and, via 96, to the winding 92. That winding is thus energized as long as the starter motor is energized. Energization of the electromagnet causes it to attract plate 63, opening valve 66 immediately and holding it open as long as switch 100 is closed. When the engine starts switch 100 is opened; but, with the engine then turning over at normal idling or faster, the manifold depression applied via 82 is then ample to hold valve 66 open. Spring 70 may be set to exert about the same pressure as before described so that the small manifold depression occurring at low speed "lugging" will still hold the valve open.

Figure 3:
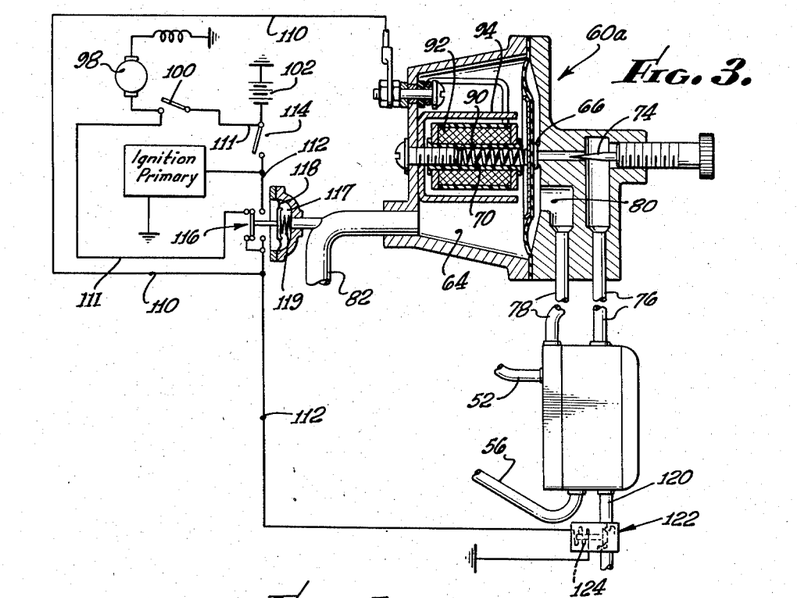
Fig. 3 is a schematic showing the control valve actuated in the ignition circuit.

Fig. 3 shows other arrangements for opening the control valve and holding it open. In that figure the valve 60a and its appurtenances are the same as in Fig. 2 and are given the same numerals. The magnet winding 92 is here connected into the primary circuit of the engine ignition system. As schematically shown, a conductor 110 connects the live side of the winding into conductor 112 which is controlled by ignition switch 114. For the moment disregarding the switch shown at 116, and assuming that 110 is directly connected to 112, the magnet winding will be energized and valve 60a held open at all times that the ignition switch is closed—that is, at all times during starting turn-over and all other phases of engine operation. Accordingly, in this system of Fig. 3 the manifold depression need not be depended upon at all for either opening the valve or holding it open, and the manifold connection 82 to valve 60a can if desired be dispensed with. However, in the preferred form of the system described below the manifold depression holds valve 60a open.

Fig. 3 also incorporates the starter circuit, and a shut-off valve 122 in the high pressure feed line 120 leading to the regulator. As there schematically shown, valve 122 is a normally closed valve opened by solenoid 124 when energized via conductor 112. Ignoring switch 116, valve 122 will always be open when the ignition switch is closed.

The starter circuit includes switch 100 which energizes starter motor 98 and also energizes lines 110 and 112 via line 111. Closure of starter switch 100 will thus also open valve 60a, and, again assuming 111 to be connected to 112, will also open shut-off valve 122.

Preferably, a manifold actuated switch 116 is interposed in line 112 and its connection to line 110. As schematically shown in Fig. 3, a small diaphragm chamber 117 is communicated with the manifold via 82. Diaphragm 118 is pressed out by a light spring 119 and normally holds switch 116 in the illustrated position connecting line 111 to 110 and 112 leading to valve 60a and shut-off valve 122. Closure of the starting switch thus opens valve 60a and shut-off 122. As soon as the engine is turning over, or starts, diaphragm 118 moves in and moves switch 116 to a position to break the connection of 111 with 110 and 112 and to close the line 112 leading from the ignition circuit. Closure of ignition switch 114 during engine turn-over and operation consequently holds valve 60a and shut-off 122 open during all engine operation after the connection to the starter circuit is broken. And the manifold depression, via 82, may also hold valve 60a open. This arrangement prevents leakage of fuel through valve 60a if ignition switch 114 is closed or left closed with the engine standing and not drawing in the fuel that passes through the valve. If the engine is not operating, switch 116 breaks the connection of the ignition circuit to both valve 60a and shut-off 122. With both those valves closed there is a double shut-off preventing leakage through the regulator.

As in Fig. 2, the engine may be started with open throttle, without the necessity of making switch 116 respond to the very light manifold depression existing on starting turn-over. Once the engine has started, the increased manifold depression holds valve 60a open and the ignition circuit holds cut-off 122 and also valve 60a open.

With such a cut-off valve in the initial feed to the regulator, its normal delivery pressure need not be subatmospheric in order to shut off fuel delivery (beyond the small amount contained in the regulator chamber) with the engine standing. Regardless of what the normal delivery pressure may be, the system acts to control that delivery pressure. This same cut-off system is shown also in Fig. 1 and other figures to be described, and the same remarks apply to them.

The same electrically controlled shut-off for the initial feed to the regulator may be incorporated in the system of Fig. 1. As there shown, the shut-off valve 122 is in the same circuiting with the ignition and starter switches and switch 116; with the same control of the shut-off valve. As discussed later on in connection with other forms of the system, the shut-off valve, actuated by engine turn-over, may be the controlling element in raising the delivery pressure of the regulator. In Fig. 1, with the initial shut-off 122, there is a double shut-off of the high pressure preventing leakage through the regulator with the engine standing; both valves 122 and 60 then being closed. Each of those valves is an engine controlled means for applying pressure to the reference chamber. This is also true of all the systems here described, excepting only that of Fig. 5 where the cut-off valve 122 solely performs the engine controlled actuation of the system.

It has been mentioned before that the high pressure that is applied to the reference chambers may come directly from any suitable high pressure source. Thus, in Fig. 1, valve 60 may be fed with pressure fluid directly from the supply 120 and the regulator may be single stage. This is true of all the variant forms of my system shown here.

Fig. 4 shows a system similar generally to that of Fig. 1 but with further modifications. The parts similar to those of Fig. 1 are given the same numerals.

In Fig. 4 the carbureter air intake 14 is schematically shown equipped with an obstruction, illustratively in the form of an air cleaner 15, in which, by the depression of an oil level such as that at 13 in order to pass air to the intake, a definite drop in pressure below atmospheric is imposed on the air entering intake 14 and passing through the carbureter to the engine manifold. And the valve 60b, performing generally the same functions as 60 in Fig. 1, is actuated at least partly, or even wholly, by that pressure drop; and so also is the diaphragm 118 that operates switch 116. Hereinafter, in referring to an air cleaner, an obstruction sufficient for the described operation is intended.

Valve 60b, as here shown, has a diaphragm chamber 64c of which diaphragm 62c forms one wall with its outer face exposed to atmospheric pressure via opening 62d. Passage 82 communicates with chamber 64c.

A valve stem 66d extends movably through wall 602 of chamber 64c and projects into a valve chamber 80c where, by movement downward (in the figure) it presses down on the flat spring 70c that normally holds valve pad 66c in a position closing the communication between passage 72c and chamber 80c. The feed of gas from passage 76 to passage 72c is adjusted by valve 74c, and passage 78 takes gas from chamber 80c to pass it to reference chamber 50. On downward movement of diaphragm 62c to open the valve at 66c, another valve formation 66e seals off any leakage around the valve stem where it passes through wall 602.

In this arrangement, passage 82, and also the passage 82c that goes to the diaphragm chamber 117 operating switch 116, may communicate with the air and mixture passage at any point beyond the pressure-dropping obstruction 15, either ahead of the throttle or beyond it. The same remarks apply to the modified form of valve 60 shown in Fig. 1a. Connected at any point beyond the obstruction in Fig. 4, the valve 60b and the switch operating diaphragm 118 are actuated by the pressure drop due to the obstruction, and will be operated during starting turn-over at open throttle and then throughout all other ranges of engine operation.

Valve 60b of Fig. 4 is obviously applicable to the system of Fig. 1.

Fig. 4 shows valve 40a, that controls the port 42 leading from first stage chamber 24 to second stage chamber 36, opening against the pressure in 24 instead of with that pressure as in Fig. 1. A light closing spring 40b carries and centers the valve, the valve stem being guided by guide 40c. Lever 44 bears on the stem so that movement of diaphragm 38 into chamber 36 opens the valve against the pressure in 24.

This arrangement tends to stabilize the pressure in 36 when the feed pressure in 24 varies. Pressure in 24 tends, by pressure on the valve, to close it, and thus to reduce the pressure in 36. But the reference pressure in 50, tending to open the valve, also varies as the valve closing pressure in 24 varies. Thus, if pressure in 24 increases, increasing the closing pressure on the valve, the increased pressure in 24, fed to 50 via valve 60, compensatingly increases the valve opening pressure in 50. This arrangement of valve 40 is applicable to Fig. 1 and to all others where the control is exercised by feeding pressure to chamber 50.

Fig. 4 also shows a valvular unit 130, that can also be used in any of the other forms, to variably control the delivery pressure in chamber 36 by varying the pressure in reference chamber 50. Unit 130 is inserted in the balance tube 52. Tube 52 leads from reference chamber 50 to a diaphragm chamber 132 of which the small diaphragm 134 forms one wall. Diaphragm 134 falls by gravity or is pressed down by a light spring and, with the system at rest, is in a lower position where pin 136 carried by it partially plugs the port 138 leading from chamber 132 to passage 140 from which balance tube 52 leads on to the air intake. Diaphragm 134 will be raised by a small difference in pressure in 50 over that at the air intake, say by a differential of one-tenth inch of water. On initial actuation of the system, with pin 136 plugging hole 138, the bleeding capacity of the balance tube is reduced and pressure in 50 immediately builds up to raise pressure in 36 temporarily above that previously described in connection with Fig. 1. The pressure in 50 above that at 14 then slowly raises diaphragm 134, the rate being controlled by a small bleed 142 leading from the back of the diaphragm. When pin 136 is raised out of hole 138 the balance tube 52 bleeds more freely and the relative pressures in 50 and 36 fall to what has been previously described. The valve 130 may be used on any of the various forms described in this specification.

Figure 5:
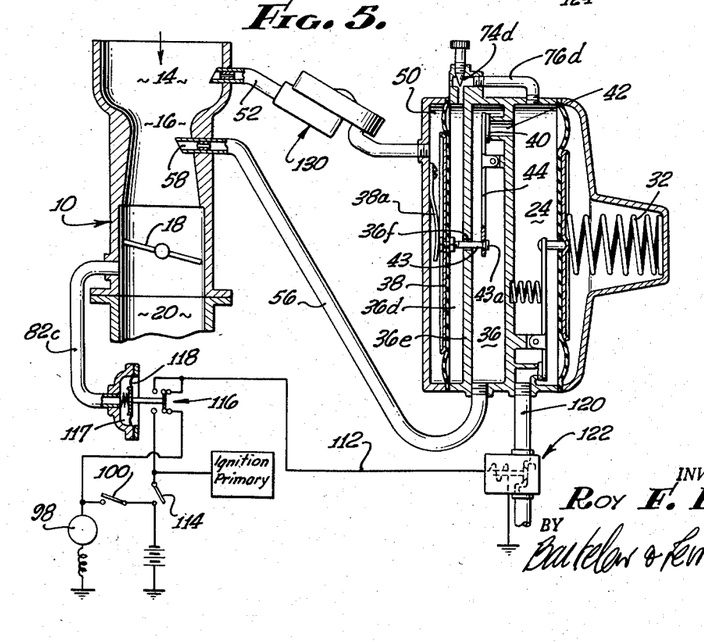
Figs. 5 and 6 are schematics showing modifications controlled by an initial shut-off valve.

Fig. 5 shows another arrangement for controlling the delivery pressure of the regulator, controlled by engine operation. The parts similar to those shown in Figs. 1 and 4 are given the same numerals.

Control of shut-off valve 122 by the starter and ignition circuits and switch 116 is the same as in Figs. 1, 3 and 4. As mentioned in connection with Fig. 4, the passage 82c can connect with the air and mixture passage at any point if an obstruction such as an air cleaner is on the intake 14.

The valve biasing spring 46 is omitted in Fig. 5 and diaphragm 38 only pulls on valve lever 44 to close valve 40. Pin 43 is secured to the diaphragm and has a head 43a that pulls on the lever.

A passage 76d, adjustably controlled by needle valve 74d, passes pressure from the first stage chamber 24 to sub-chamber 36d which forms a reference chamber at the inside face of diaphragm 38 divided off from delivery 36 by wall 36e. Wall 36e has a leak port through which the pressures in 36d and 36 tend to equalize; that port being conveniently formed at 36f where pin 43 passes loosely through the wall. Reference chamber 50 is connected to atmosphere, or the air intake, by balance tube 52, which in this instance needs no calibration.

On opening of shut-off valve 122 by virtue of the engine turning over, pressure fluid is fed to the first stage chamber 24 and, via 76d from that chamber to the reference chamber 50. Fluid pressure on valve 40 tends to open it to raise the pressure in 36. Without the passage 76d, the pressure in 36 would stabilize at a pressure above that in reference chamber 50 by an amount depending on the opening pressure on valve 40. Needle valve 74d is adjusted to feed pressure fluid into reference chamber 36d at a rate that, bleeding into 36 through 36f, will keep pressure in 36d above that in 36. Pressure in 36d tends to close valve 40 and lower the delivery pressure in 36. By suitable adjustment of valve 74d the delivery pressure in 36 can be stabilized at the desired point. And it will be noted that here again the pressure in 36 will not vary with variations in pressure in 24 or in the initial supply line; for as the opening pressure on valve 40 varies, the valve closing pressure in 36d also varies. It will be noted that the pressure in 36d bleeds, via 36 and 56, to the air and mixture passage; the bleed thus being similar to the bleed of reference chamber 50 in, for instance, Fig. 1.

A light spring 38a holds valve 40 open when there is no pressure in 24. Then, when cut-off 122 opens spring 38a holds valve 40 open as the pressure in 24 builds up, thus providing a momentary pulse of starting fuel in delivery chamber 36 before valve 40 closes. The amount of the pulse depends on how far spring 38a holds the valve open. Such a spring will have the same effect in, for example, such systems as that of Figs. 4 and 7 if the valve 60 were made to be a simple adjusted passage. The valve 130 may also be used in this system of Fig. 5 to provide a starting pulse; and also in that of Fig. 6.

When the engine stops, cut-off valve 122 closes and any fuel gas remaining in chamber 24 bleeds out through 76d and 36. When the engine again turns over, the whole system is put into operation by the opening of cut-off valve 122. In this and other similar forms or in forms such as those of Figs. 1 and 4 if the normal delivery pressure is not sub-atmospheric, the whole, or initial, engine control of the pressure controlling systems is through the cut-off valve.

A variant of the form of Fig. 5 is illustrated in the forms of Figs. 1, 3 and 4. Assume, for example in Fig. 1, that the valve 60 is eliminated or is always open so that 76 is always connected with 78 and reference chamber 50. Valve 40 may or may not be biased closed by spring 46, so that the normal delivery pressure may be, say, atmospheric. Here again, the system is put into operation to control and maintain the desired delivery pressure by the engine controlled opening of cut-off valve 122.

Figures 6, 7:
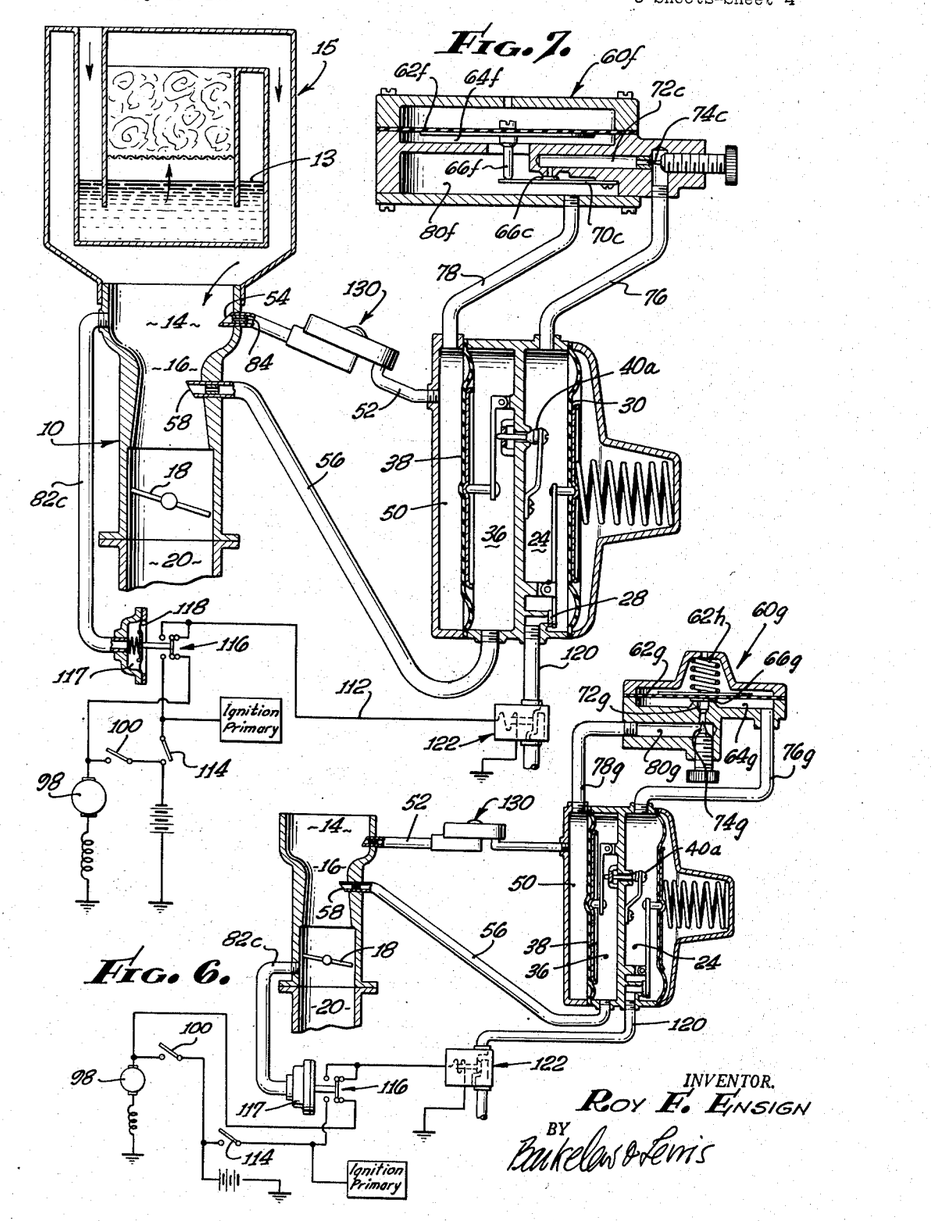
Fig. 7 is a schematic similar to Fig. 4, showing further modifications.

Fig. 6 shows another modification in which the leakage from chamber 24, when the engine stops and shut-off 122 is closed, is limited; and also in which the feed of pressure gas, instead of going to the sub-chamber 36d of Fig. 5, goes to the reference chamber 50 as in e.g. Figs. 1 and 4.

In Fig. 6 the electrical controls of shut-off 122 are the same as in the other figures. The regulator is shown as having a valve 40a like that in Fig. 4. Its normal delivery pressure may be atmospheric or sub-atmospheric.

Valve 60g has a diaphragm chamber 64g to which passage 76g leads from first stage chamber 24. Movement of diaphragm out of its chamber (upward in the figure) is opposed by a spring 62h which is chosen or adjusted to allow upward diaphragm movement at, say, about 80% of the pressure normally existent in 24. Upon engine controlled opening of shut-off 122 diaphragm 62g moves up as soon as the pressure in 24 builds up, and lifts valve pad 66g to open passage 72g leading from 64g to passage 80g from which tube 78g leads to reference chamber 50d. Passage or port 72g is adjusted by needle valve 74g.

As soon as the pressure in 24 builds up and the valve at 66g opens, the action of raising the pressure in 50 and 36 is the same as described in connection with e.g. Fig. 1. On engine stoppage and closure of shut-off 122 only a small part of the pressure in 24 can leak off through 78g, valve 66g closing when that pressure is down to, say, 80% of normal.

Fig. 7 shows a modification of Fig. 4, in which the manifold connection passage 82 to the valve 60 is dispensed with. The parts similar to those of Fig. 4 are given the same numerals.

In this figure the control valve 60*f* has a diaphragm chamber 64*f* that is open to and in effect forms part of chamber 80*f* to which passage 78 connects and leads to reference chamber 50. The back side of diaphragm 62*f* is exposed to atmospheric pressure. The diaphragm carries a pin 66*f*, that, on diaphragm movement into chamber 64*f* (down in the figure) pushes on spring 70*c* to move valve pad 66*c* off its seat and open passage 72*c* to chamber 80*f*.

On engine turn-over, the depression, relative to atmospheric pressure, in air intake 14 due to the obstruction 15, is communicated to diaphragm chamber 64*f* via the balance tube 52, reference chamber 50 and tube 78. Valve pad 66*c* is thus moved off its seat by downward diaphragm movement, and pressure gas is admitted from 76 to reference chamber 50 to raise the pressure there and the delivery pressure in 36 to whatever pressure is desired relative to the pressure in air intake 14.

In Fig. 7, the passage 82*c* is shown coming from the air intake, as has been remarked before.

The valve 60*f* of Fig. 7 may also be set to act as a safety valve to relieve excessively high pressure in chamber 24 in the event of leakage in the valves controlling feed to that chamber. In Fig. 7 the valve closing spring 70*c* may be set or chosen to close the valve at 66*c* against a pressure, in 72*c*, of something above the normal pressure in 24. That abnormal pressure under which the valve will be pressed open may be, e.g. fifteen p.s.i. if the normal pressure is 7 or 8 p.s.i. The same is true of the valves generally denoted 60 in the other figures, where the valve closing springs may be set or adjusted to open on any abnormal pressure building up in 24. Such relief action protects the regulator against abnormal pressures.

Figures 9, 10:
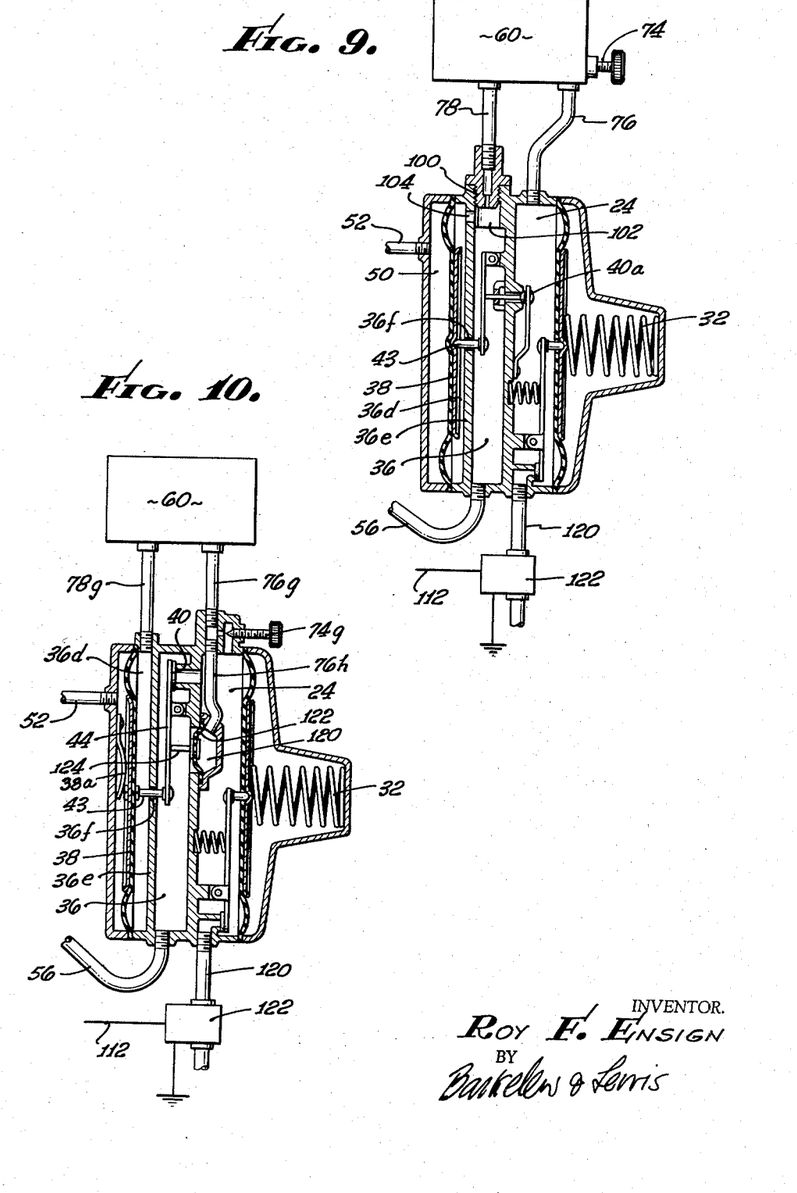
Figs. 9 and 10 show other modified systems.

Fig. 9 shows another modification similar in certain respects to Fig. 5. In this form of Fig. 9 the reference pressure chamber 36*d* is divided off from chamber 36 by wall 36*e* with bleeder port 36*f*, as in Fig. 5. However, instead of applying positive pressure to 36*d* as in Fig. 5, negative pressure is applied as now described.

A nozzle 100 discharges a pressure stream from the high pressure source into an ejector space 102 with which chamber 36*d* communicates via a port 104. The feed of pressure gas to nozzle 100 is here shown typically as via the tubes 76 and 78 controlled by a valve 60 and needle adjustment 74. The valve 60 may be any of the valves as heretofore described as 60, 60*a*, etc. and controlled in any of the manners before described. Or, it may be a simple needle adjustment, as in Fig. 5; and if so, shut-off 122 must be used to shut off the initial fuel feed. As in the other figures, two controlled valves, 60 and 122, may be used, or only one. Controls for the valve or valves may be any of the controls here described.

In this Fig. 9, the normal delivery pressure of the regulator will typically be lower than that desired for operation. The valve 40*a* may be biased toward closing, as by closing with the pressure in 24. The function of the ejector action is then to lower the pressure in 36*d* by the ejector action at 100, 104, to cause diaphragm 38 to move to the right to open valve 40*a* and raise the pressure in 36. The restrictions at needle 74 and at bleed orifice 36*f* regulate the amount of the delivery pressure increase.

Fig. 10 shows another modification of Fig. 5; the parts in Fig. 10 that are the same as in Fig. 5 being given the same numerals. In Fig. 10 a passage tube 76*g* receives pressure from 24 under adjustment control of needle 74*g* and goes to the control valve indicated at 60. Valve 60 may be any of the engine controlled valves 60, 60*a*, etc. heretofore described. From valve 60 a passage tube 78*g* goes to reference chamber 36*d*. Needle 74*g* also controls pressure feed from 24 to a passage tube 76*h* that leads to a diaphragm chamber 120 housing a small diaphragm 122 having a pin 124 that presses against valve lever 44 in a direction to close valve 40 when diaphragm 122 moves to the left. Valve 60 has no adjustment needle, such as 74; needle 74*g* performing the function of 74. All passages through valve 60 should be large enough to give 74*g* control for the operation here described. Valve 122 may be used here, but is not necessary to shut off the regulator.

As in Fig. 5, regulator valve 40 may be biased open. With valve 60 opened under engine control, pressure is fed from 24 to 36*d* with the same operative result as in Fig. 5. The pressure in 76*g*, 76*h* and chamber 120 is then considerably lower than in 24, so that the valve closing pressure exerted by diaphragm 122 is less than the valve opening pressure on valve 40. When valve 60 closes, under engine control, the pressure in chamber 120 immediately builds up to that in 24; and, diaphragm 122 being larger than valve 40, the valve is immediately forced closed, thus closing all discharge passages leading from 24.

The biasing spring 38*a*, which may be used in any of the system forms here described to give a starting fuel pulse, may be a bimetallic thermostatic spring arranged to be stiffer at low temperatures and less stiff at higher temperatures. Regulators such as here described are usually installed in close proximity to the engine and warm up as the engine warms up. The bi-metallic spring will then exert greater valve opening pressure when the engine is cold, and less or none when the engine is warm.

The valve of Fig. 4 may also provide a starting pulse. For that purpose valve stem 66*d* may fit loosely in the bore through wall 60*2*. Atmospheric opening 62*d* is then sized to slow the downward movement of diaphragm 62*c*. Tube 82 being sufficiently large to apply operating depression to chamber 64*c* on starting turnover in spite of the leak around the valve stem, diaphragm 62*c* moves down at a regulated rate and opens valve 66*c* before seating valve 66*e*. While 66*c* is open and before 66*e* closes fuel from 80*c* flows through the leak and through 82 to the carbureter passage to provide the starting fuel pulse.

In any of the forms, for instance in Fig. 4, where the valve structure 130 is used to provide a starting fuel pulse, the calibration at 84 should be larger than has been described in connection with Fig. 1, or eliminated; so as to allow the valve 130 to control the size of the restricted calibration.

Fig. 8 shows a modified control circuit that may be substituted for any of those previously described. In this modified circuit instead of initially energizing valve 60 and/or shut-off 122 from the starter or ignition circuit, a manual push button 100*a* initially closes the circuit from the battery to lines 112 and/or 110 leading to 122 and 60. As soon as the engine turns over or starts the manifold actuated switch 116*a*, paralleling 100*a*, then closes the circuit and holds it closed during engine operation. Or, in the forms where the control valve is opened or held open by manifold depression, for example valve 60*a* of Fig. 3, and if shut-off 122 is not used or is opened by engine controlled means other than electrical circuiting, the push button may be used alone and the valve then held open by the manifold depression.

The purely schematic showings here do not attempt to show any of the various practical physical designs either of the regulator, or of the practical physical association of valve 60 and of passages 76 and 78, etc. with the regulator. All such things may be designed and arranged for simplicity and efficiency of manufacture and operation without departing from the present invention.

As has been stated, the system, controlling the regulator delivery pressure, automatically provides fuel in correct proportions for starting, idling, and medium and heavy range operation. And it gives improved results at low speed "lugging" with throttle wide open, and at heavy acceleration from low speed because of the practically instantaneous response of the regulator in its balanced condition.

I claim:

1. In a gaseous fuel feed system for internal combustion engines, said system comprising a carbureter having an air and mixture passage adapted to feed mixture into the intake manifold of an engine, said passage having an air intake, a venturi throat and a throttle, a gas pressure regulator having a delivery chamber with a diaphragm subject on one face to the pressure in that chamber, an inlet for said chamber controlled by an inlet valve, connection between the valve and diaphragm such that diaphragm movement toward the delivery chamber causes the valve to open, a reference pressure chamber at one face of the diaphragm, a bleeding passage communicating the reference pressure chamber to the air and mixture passage, and an outlet for the delivery chamber feeding gas therefrom to the venturi throat, the regulator normally delivering to the venturi throat at a predetermined normal pressure; the combination of, a source of gas under a substantially uniform pressure higher than the pressure existent at the carbureter air intake, a pressure feed passage leading from said source to the reference chamber, a normally closed valve in said passage, and means, actuated by virtue of engine operation, acting to open said valve, each of said bleeding and pressure feed passages being restricted, said restricted passages being so related in effective size that, with the normally closed valve open, the pressure in the reference chamber is controllably modified with relation to that existent in the air and mixture passage, thus controlling the delivery pressure of the regulator.

2. The combination defined in claim 1, and in which the pressure feed passage also leads to the valve controlled inlet of the regulator, and the normally closed valve controls the feed of pressure to both the reference pressure chamber and the regulator inlet.

3. The combination defined in claim 2, in which the normally closed valve is electrically actuated to open, an electrical circuit for actuating the normally closed valve, and a switch in said electrical circuit actuated by virtue of engine operation.

4. The combination defined in claim 2, in which the regulator comprises two stages, from one stage of which the valve controlled inlet to the delivery chamber is fed, in which the pressure feed passage controlled by the normally closed valve feeds pressure to said one stage, and in which the feed passage to the reference pressure chamber leads from said one stage.

5. The combination defined in claim 4, and including also a second normally closed valve controlling the feed passage to the reference pressure chamber, and means actuated by virtue of engine operation to open said second valve.

6. The combination defined in claim 1, and including a valvular device for varying the restriction of the bleeding passage, said valvular device comprising a port forming a part of the bleeding passage, a diaphragm and structure forming diaphragm chambers at its opposite faces, one of said chambers communicating with said port and the other having a restricted bleeding outlet, and a closure carried by the diaphragm and adapted in one diaphragm position to partially close said port and in another diaphragm position to open said port.

7. The combination defined in claim 1, in which said reference pressure chamber is formed between the diaphragm and a wall lying between the diaphragm and the delivery chamber, said wall having a restricted opening constituting the said bleeding passage, the normal delivery pressure of the regulator being above that existent in the air and mixture passage, a second reference chamber at the face of the diaphragm opposite the delivery chamber, and a balance passage communicating to said second reference chamber substantially the pressure existent at the carbureter air intake.

8. In a gaseous fuel feed system for internal combustion engines, said system comprising a carbureter having an air and mixture passage adapted to feed mixture into the intake manifold of an engine, said passage having an air intake, a venturi throat and a throttle, a two-stage gas pressure regulator having a delivery chamber with a diaphragm subject on one face to the pressure in that chamber, an inlet for said chamber controlled by an inlet valve, said inlet fed from the first stage of the regulator, connection between the valve and diaphragm such that diaphragm movement toward the delivery chamber causes the valve to open, the other face of the diaphragm being subject to the pressure existent at the air intake, and an outlet for the delivery chamber feeding gas therefrom to the venturi throat, the regulator normally delivering at a predetermined pressure; the combination of, a wall with a restricted perforation therethrough extending across the delivery chamber to form a second reference pressure chamber between the wall and the diaphragm, an initial inlet passage for gas under pressure leading to the first stage of the regulator, a continuously open but restricted passage leading from said first stage to said second reference chamber, a normally closed valve controlling the initial inlet passage, and means, actuated by virtue of engine operation, acting to open said valve, the restricted perforation and passage being so related in effective size that, with the normally closed valve open, the pressure in the second reference chamber is raised to or above that existent at the air intake.

9. The combination defined in claim 7, in which the normally closed valve is electrically actuated to open position, an electrical circuit for actuating said valve, and a switch controlling said circuit actuated by virtue of engine operation.

10. The combination defined in claim 8, and also including a spring acting to yieldably hold the inlet valve of the regulator open.

11. In a gaseous fuel feed system for internal combustion engines, said system comprising a carbureter having an air and mixture passage adapted to feed mixture into the intake manifold of an engine, said passage having an air intake, a venturi throat and a throttle, a gas pressure regulator having a delivery chamber with a diaphragm forming one of its walls, an inlet for said chamber controlled by an inlet valve, connection between the valve and the diaphragm such that movement of the diaphragm into the chamber causes the valve to open, a reference pressure chamber at the face of the diaphragm opposite the delivery chamber, a balance communication communicating to the reference pressure chamber substantially the air pressure existent at the carbureter air intake, and an outlet for said delivery chamber feeding gas therefrom to the venturi throat, the regulator normally delivering to the venturi throat at a predetermined normal pressure; the combination of, a source of gas under a substantially uniform pressure higher than the pressure existent at the carbureter air intake, a passage leading from said source to the reference chamber, a normally closed valve in said passage, means, actuated by virtue of engine operation, acting to open said valve, said balance communication and said last mentioned passage each being restricted, said restricted passages being so related in effective size that, with the normally closed valve open and with the restricted balance communication acting as a bleed for the reference chamber, the pressure in the reference chamber is raised above that existent at the air intake causing corresponding raising of the delivery pressure of the regulator.

12. The combination defined in claim 11, in which the engine has a switch controlled ignition circuit, and in which the means actuated by virtue of engine operation includes electrical circuit means controlled by said switch.

13. The combination defined in claim 12, and including also a controlling switch in said circuit means actuated by intake manifold depression.

14. In a gaseous fuel feed system for internal combustion engines, said system comprising a carbureter having an air and mixture passage adapted to feed mixture into the intake manifold of an engine, said passage having an air intake, a venturi throat and a throttle, a gas pressure regulator having a delivery chamber with a diaphragm forming one of its walls, an inlet for said chamber controlled by an inlet valve, connection between the valve and the diaphragm such that movement of the diaphragm into the chamber causes the valve to open, a reference pressure chamber at the face of the diaphragm opposite the delivery chamber, a balance communication communicating to the reference pressure chamber substantially the air pressure existent at the carbureter air intake, and an outlet for said delivery chamber feeding gas therefrom to the venturi throat, the regulator normally delivering to the venturi throat at a predetermined normal pressure; the combination of, a source of gas under a substantially uniform pressure higher than the pressure existent at the carbureter air intake, a passage leading from said source to the reference chamber, a normally closed valve in said passage, means, actuated by engine intake manifold depression, acting to open said valve, said balance communication and said last mentioned passage each being restricted, said restricted passages being so related in effective size that, with the depression actuated valve open and with the restricted balance communication acting as a bleed for the reference chamber, the pressure in the reference chamber is raised above that existent at the air intake causing corresponding raising of the delivery pressure of the regulator.

15. The combination defined in claim 11, in which the engine has a switch controlled starting motor circuit, and including electrical means controlled by said switch and acting to open said valve.

16. The combination defined in claim 11, and in which at least one of the said restricted passages is adjustable.

17. The combination defined in claim 14, and in which at least one of the said restricted passages is adjustable.

18. The combination defined in claim 11 and in which the said balance communication for the reference chamber connects with the carbureter air intake to pick up the pressure therein and to discharge bled gas into said intake.

19. The combination defined in claim 14 and in which the said balance communication for the reference chamber connects with the carbureter air intake to pick up the pressure therein and to discharge bled gas into said intake.

20. The combination defined in claim 11, in which the regulator is of the multiple-stage type with the said delivery chamber, diaphragm and diaphragm operated valve constituting its last stage, and in which a preceding stage constitutes the said source of gas under a substantially uniform pressure.

21. The combination defined in claim 20, and also including a second normally closed valve controlling the initial feed of gas to the preceding stage, and means actuated by virtue of engine operation acting to open said second valve.

22. In a gaseous fuel feed system for internal combustion engines, said system comprising a carbureter having an air and mixture passage adapted to feed mixture into the intake manifold of an engine, said passage having an air intake, a venturi throat and a throttle, a gas pressure regulator having a delivery chamber with a diaphragm forming one of its walls, an inlet for said chamber controlled by an inlet valve, connection between the valve and the diaphragm such that movement of the diaphragm into the chamber causes the valve to open, a reference pressure chamber at the face of the diaphragm opposite the delivery chamber, a balance communication communicating to the reference pressure chamber substantially the air pressure existent at the carbureter air intake, and an outlet for said delivery chamber feeding gas therefrom to the venturi throat, the regulator normally delivering to the venturi throat at a pre-determined normal pressure, and an ignition circuit for the engine; the combination of a source of gas under a substantially uniform pressure higher than the pressure existent at the carburetor air intake, a passage leading from said source to the reference chamber, a normally closed valve in said passage, electrical circuit means connected into the ignition circuit and acting to open said valve whenever the ignition circuit is energized, a normally closed valve controlling initial feed of fuel to the regulator, said electrical circuit means including means acting to open said feed controlling valve whenever the ignition circuit is energized, said balance communication and said last mentioned passage each being restricted, said restricted passages being so related in effective size that, with the normally closed valve open and with the restricted balance communication acting as a bleed for the reference chamber, the pressure in the reference chamber is raised above that existent at the air intake causing corresponding raising of the delivery pressure of the regulator.

23. The combination defined in claim 11 and in which the normally closed valve comprises a casing including a diaphragm exposed on one face in a diaphragm chamber to the pressure existent in the reference pressure chamber and on its other face to atmospheric pressure, and valve means opened by movement of said valve diaphragm into its chamber.

24. The combination defined in claim 1 and in which the normally closed valve and the means acting to open said valve are incorporated in a valve structure comprising a first chamber forming a part of the pressure feed passage, a normally closed valve controlling admission of gas to said chamber, a second chamber separated from the first chamber by a wall and communicating with the air and mixture passage to be subjected to depression therefrom, a diaphragm forming another wall of said second chamber and exposed on its outer face to atmospheric pressure, and a stem connected to the diaphragm and extending through the first mentioned wall to operate the valve.

25. The combination defined in claim 24 and in which there is a leak port through the first mentioned wall, the diaphragm carries a valve closure to close the leak port when the diaphragm moves to open the first mentioned valve, and in which the exposure of the diaphragm to atmospheric pressure is restricted.

26. The combination defined in claim 1, in which said reference pressure chamber is formed between the diaphragm and a wall lying between the diaphragm and the delivery chamber, said wall having a restricted opening constituting the said bleeding passage, the normal delivery pressure of the regulator being below that existent in the air and mixture passage, and said pressure feed passage terminating in a nozzle in ejector relation to the reference pressure chamber.

27. In a gaseous fuel feed system for internal combustion engines, said system comprising a carbureter having an air and mixture passage adapted to feed mixture into the intake manifold of an engine, said passage having an air intake, a venturi throat and a throttle, a gas pressure regulator having a delivery chamber with a diaphragm forming one of its walls, an inlet for said chamber controlled by an inlet valve, connection between the valve and the diaphragm such that movement of the diaphragm toward the chamber causes the valve to open, a reference pressure chamber at the face of the diaphragm opposite the delivery chamber, a balance communication communicating to the reference pressure chamber substantially the air pressure existent at the carbureter air intake, and an outlet for said delivery chamber feeding gas therefrom to the venturi throat, the regulator normally delivering to the venturi throat at super-atmospheric pressure; the combination of a restrictedly perforated wall between the diaphragm and the delivery chamber forming with the diaphragm a second reference chamber, a source of gas under a substantially uniform pressure higher than the pressure existent at the carbureter air intake, a second diaphragm chamber and a diaphragm forming one of its walls, connection between the second diaphragm and the inlet valve such that movement of said diaphragm outward of its chamber closes the inlet valve, a normally closed valve and means, actuated by virtue of engine operation, to open the normally closed valve, a passage leading from the normally closed valve to the second reference chamber, passage means leading from the pressure source to said normally closed valve and the second diaphragm chamber, and a restriction in said passage means.

No references cited.